United States Patent [19]

Shachi et al.

[11] Patent Number: 5,721,331
[45] Date of Patent: Feb. 24, 1998

[54] ISOBUTYLENE-BASED POLYMER AND PROCESS OF PRODUCING THE SAME

[75] Inventors: Kenji Shachi; Satoshi Kajiya; Kazushige Ishiura, all of Tsukuba, Japan

[73] Assignee: Kuraray Co., Ltd., Kurashiki, Japan

[21] Appl. No.: 610,873

[22] Filed: Mar. 5, 1996

[30] Foreign Application Priority Data

Aug. 3, 1995 [JP] Japan ...................................... 7-077336

[51] Int. Cl.⁶ ................................................... C08F 10/10
[52] U.S. Cl. ...................... 526/347; 526/135; 526/147; 526/185; 526/189; 526/192; 526/237; 526/348.7; 525/245; 525/249; 525/251; 525/267; 525/270; 525/333.3; 525/333.4; 525/333.7; 525/334.1; 525/371
[58] Field of Search ...................... 526/135, 147, 526/348.7, 185, 189, 192, 347, 237; 525/245, 249, 251, 319, 333.3, 333.4, 333.7, 334.1, 571, 267, 270

[56] References Cited

U.S. PATENT DOCUMENTS

| Re. 34,640 | 6/1994 | Kennedy et al. . |
|---|---|---|
| 4,276,394 | 6/1981 | Kennedy et al. . |
| 4,316,973 | 2/1982 | Kennedy . |
| 4,910,321 | 3/1990 | Kennedy et al. . |
| 4,929,683 | 5/1990 | Kennedy et al. . |
| 4,946,899 | 8/1990 | Kennedy et al. . |
| 5,066,730 | 11/1991 | Kennedy et al. . |
| 5,122,572 | 6/1992 | Kennedy et al. . |
| 5,219,948 | 6/1993 | Storey et al. . |
| 5,395,885 | 3/1995 | Kennedy et al. . |

FOREIGN PATENT DOCUMENTS

| 0 265 053 | 4/1988 | European Pat. Off. . |
|---|---|---|
| 0 344 021 | 11/1989 | European Pat. Off. . |
| 0 397 081 | 11/1990 | European Pat. Off. . |
| WO 91/07451 | 5/1991 | WIPO . |
| WO 93/02110 | 2/1993 | WIPO . |

OTHER PUBLICATIONS

Journal of Polymer Science, vol. 29, No. 3, pp. 421–426, Mar. 15, 1991, G. Kaszas, et al., "Polyisobutylene–Containing Block Polymers by Sequential Monomer Addition I. The Living Carbocationic Polymerization of Styrene".

Makromolekulare Chemie, Macromolecular Symposia, vol. 60, pp. 37–45, Jul. 1, 1992, R. Lukas, et al., "Effect of the Mixture t–ByCl/SnCl4 on the Cationic Polymerization of Isobutylene".

*Primary Examiner*—Fred Teskin
*Attorney, Agent, or Firm*—Oblon, Spivak, McClelland, Maier & Neustadt, P.C.

[57] ABSTRACT

An isobutylene-based polymer as a polymer of cationically polymerizable monomers principally composed of isobutylene or a combination of isobutylene and a styrene-series monomer, generates a molded article with outstanding properties, the isobutylene-based polymer characteristically satisfying the following provisions;

1. the isobutylene-based polymer has a substantially continuos molecular weight distribution on a gel-permeation chromatogram;
2. the molecular weight at the highest peak on a gel-permeation chromatogram is within a range of 10,000 to 500,000; and
3. the length (a) of the elution time in the lower molecular region of the mountain from the highest peak and the length (b) of the elution time in the higher molecular region of the mountain from the highest peak on a gel-permeation chromatogram, satisfy the provision represented by the formula $(b)/(a) \geq 1.3$.

9 Claims, 1 Drawing Sheet

ISOBUTYLENE-BASED POLYMER AND PROCESS OF PRODUCING THE SAME

BACKGROUND OF THE INVENTION

1. Field of the Invention

The present invention relates to an isobutylene-based polymer imparting good durability and outstanding mechanical performance to a molded article, a molded article comprising the polymer, and a process of producing the polymer.

2. Related Art of the Invention

For polymerizing a cationically polymerizable monomer by cationic polymerization, generally, the growing carbocation is so unstable that the chain transfer reaction and termination reaction readily occur, with difficulty in the generation of a desired polymer under the controls of the average molecular weight and molecular weight distribution. Therefore, it is also difficult to successively polymerize plural kinds of cationically polymerizable monomers by cationic polymerization to produce a block copolymer.

However, so-called living cationic polymerization has been developed in recent years, comprising stabilizing the growing carbocation during cationic polymerization thereby suppressing side reactions such as chain transfer reaction, termination reaction and the like. The following references for example disclose a method for producing an isobutylene-based polymer in a linear chain or in a star shape, comprising living cationic polymerization of isobutylene alone or living cationic polymerization of isobutylene sequentially followed by living cationic polymerization of a styrene-series monomer, in the presence of a polymerization initiating system comprising a compound having a tertiary carbon atom bound with an acyloxyl group, an alkoxyl group, hydroxyl group or a halogen atom within the molecule and a Lewis acid; see the references U.S. Pat. No. 4,276,394; U.S. Pat. No. 4,316,973; U.S. Pat. No. 4,910,321; U.S. Pat. No. 4,929,683; U.S. Pat. No. 4,946,899; U.S. Pat. No. 5,066,730; U.S. Pat. No. 5,122,572; U.S. Reissued Pat. No. 34,640; European Patent Application No. 397,081; Journal of Polymer Science: Part A: Polymer Chemistry, Vol. 29, pp. 427–435 (1991). According to the method, more specifically, the use of isobutylene alone as the cationically polymerizable monomer produces polyisobutylene; the sequential time-lagged use of isobutylene and a styrene-series monomer as the cationically polymerizable monomers produces a block copolymer having within the molecular main chain a polymer block composed of the isobutylene unit and a polymer block composed of the styrene-series monomer unit.

U.S. Pat. No. 5,219,948 also discloses a modification of the aforementioned method for producing an isobutylene-based polymer, comprising living cationic polymerization in the presence of a polymerization initiating system, wherein titanium tetrachloride is used as a Lewis acid in the coexistence of pyridine functioning as an electron donor and the polymerization is terminated at a stage when the molecular weight distribution of an isobutylene-based polymer (living polymer) generated in the reaction system remains below a given level. More specifically, according to the description of U.S. Pat. No. 5,219,948, it is of importance so as to produce an isobutylene-based polymer with a higher average molecular weight and a narrow molecular weight distribution, that the polymerization should be terminated when the molecular weight distribution of the final polyisobutylene remains below 1.2 for the living cationic polymerization of isobutylene alone, and that the polymerization should be terminated at a stage where the molecular weight distribution of the final block copolymer remains below 1.3 for the living cationic polymerization of isobutylene sequentially followed by the living cationic polymerization of a styrene-series monomer.

In order that greater durability and outstanding mechanical performance can be exerted by an isobutylene-based polymer, more specifically by a block copolymer having within the molecular main chain a polymer block composed of the isobutylene unit and a polymer block composed of a styrene-series monomer unit useful as an elastomer, it is desirable that the average molecular weight (of the isobutylene-based polymer) is sufficiently high.

Provided that the molar ratio of an initiator compound (a compound having within the molecule the tertiary carbon atom bound with an acyloxyl group, an alkoxyl group, hydroxyl group or a halogen atom) is low to cationically polymerizable monomers for the living cationic polymerization as described above, the final molecular weight of the final polymer can be increased theoretically. As a potential means for setting a lower molar ratio of an initiator compound to a monomer to be used, the level of the monomer may be increased in the polymerization system; otherwise, the level of the initiator compound may be decreased. Because such method comprising increasing the level of the monomer in the polymerization system readily causes poor agitation due to the increase in viscosity in the polymerization system, however, the method is hardly applicable industrially. Because the method comprising lowering the level of the initiator compound in the polymerization system is readily influenced adversely by impurities such as moisture in the polymerization system, with poor reproducibility of the average molecular weight and molecular weight distribution of the final polymer, the method is neither suitable as an industrial process. It is possible at a laboratory scale to increase the average molecular weight of the final polymer to some extent by strictly preventing moisture contamination into the polymerization system, but the durability and mechanical performance of the resultant molded articles may be limited even in such case.

SUMMARY OF THE INVENTION

It is therefore a first objective of the present invention to provide an isobutylene-based polymer (specifically, a block copolymer having a polymer block principally composed of the isobutylene unit and a polymer block principally composed of a styrene-series monomer unit) imparting great durability and good mechanical performance to a molded article.

It is a second objective of the present invention to provide a molded article having great durability and good mechanical performance and comprising the isobutylene-based polymer.

Furthermore, it is a third objective of the present invention to provide a process of producing the isobutylene-based polymer with such great properties efficiently even at an industrial scale.

The present inventors have made investigations so as to attain the objectives. With respect to the production of an isobutylene-based polymer by living cationic polymerization, consequently, the present inventors have found that if the polymerization procedures are continued even after the substantially total amount of cationically polymerizable monomers is consumed during the polymerization, the number average molecular weight can additionally be increased unexpectedly although the monomers have already been consumed, bringing about a specific distribution of the molecular weight of the final isobutylene-based polymer.

The present inventors have then found that the isobutylene-based polymer from such sufficient continuation of the polymerization procedures has the following advantages. A first advantage is that the polymer can impart prominently improved durability and mechanical performance to the molded articles therefrom, compared with isobutylene-based polymers produced by such a conventional method that the polymerization reaction is terminated when the substantially total amount of cationically polymerizable monomers is consumed up. A second one is that the polymer imparts remarkably improved durability and mechanical performance to the molded articles therefrom, compared with an isobutylene-based polymer with an approximately equal number average molecular weight, produced by conventional living cationic polymerization even under the conditions that the molar ratio of an initiator compound to a monomer to be used is preset at a lower level under strict prevention against moisture contamination into the polymerization system.

The present inventors have further found that a process of mixing a Lewis acid to a linear-chain or star-shaped isobutylene-based polymer, having a functional group at the end of the molecular main chain and corresponding to or being similar to the polymer produced at the time of the consumption of the substantially total amount of cationically polymerizable monomers, by the same method as in living cationic polymerization, can also increase the final number average molecular weight with no use of any monomer, as described above, to yield a final product capable of bringing about molded articles with improved durability and mechanical performance, after sufficiently long duration of the reaction process.

Still further investigations have been carried out on the basis of the aforementioned findings. The inventors have thus achieved the present invention.

According to the present invention, the first objective can be attained by providing a polymer of cationically polymerizable monomers principally composed of isobutylene or a combination of isobutylene and a styrene-series monomer, namely an isobutylene-based polymer, satisfying the following provisions;

1. the isobutylene-based polymer has a substantially continuos molecular weight distribution on a gel-permeation chromatogram;
2. the molecular weight at the highest peak on a gel-permeation chromatogram is within a range of 10,000 to 500,000; and
3. the length (a) of the elution time in the lower molecular region of the mountain from the highest peak and the length (b) of the elution time in the higher molecular region of the mountain from the highest peak on a gel-permeation chromatogram, satisfy the provision represented by the formula (b)/(a)≧1.3.

According to the present invention, the second objective can be attained by providing a molded article comprising the isobutylene-based polymer.

According to the present invention, the third objective can be attained by providing the following processes (i) or (ii) of producing an isobutylene-based polymer.

[Process (i)]

Process of producing an isobutylene-based polymer, comprising reacting together cationically polymerizable monomers principally composed of isobutylene or a combination of isobutylene and a styrene-series monomer in the presence of a polymerization initiating system comprising a compound having a group represented by the formula

$$—C(R^1)(R^2)—X \qquad (I)$$

(wherein $R^1$ and $R^2$ independently represent an alkyl group, an aryl group or an aralkyl group; X represents an acyloxyl group, an alkoxyl group, hydroxyl group or a halogen atom) and a Lewis acid, wherein the reaction is continued until the conversion of the cationically polymerizable monomers reaches at least 95% and wherein the reaction should be continued until the provisions represented by the following formulas (II) and (III) be satisfied;

$$Mn_2 > Mn_1 \qquad (II)$$

(wherein $Mn_1$ represents the number average molecular weight of the resulting isobutylene-based polymer at the time when the conversion of the cationically polymerizable monomers reaches 95%; $Mn_2$ represents the number average molecular weight of the final isobutylene-based polymer at the time of the reaction completion)

$$[Mw/Mn]_2/[Mw/Mn]_1 \geq 1.1 \qquad (III)$$

(wherein $[Mw/Mn]_1$ represents the molecular weight distribution (the ratio of the weight average molecular weight/the number average molecular weight) of the resulting isobutylene-based polymer at the time when the conversion of the cationically polymerizable monomers reaches 95%; $[Mw/Mn]_2$ represents the molecular weight distribution (the ratio of the weight average molecular weight/the number average molecular weight) of the final isobutylene-based polymer at the time of the reaction completion).

[Process (ii)]

Process of producing an isobutylene-based polymer with a far higher molecular weight, using an isobutylene-based polymer, having the molecular main chain comprising cationically polymerizable monomer units principally composed of the isobutylene unit or a combination of the isobutylene unit and a styrene-series monomer unit and having an acyloxyl group, an alkoxyl group, hydroxyl group or a halogen atom at the end of the molecular main chain, wherein the reaction of the isobutylene-based polymer in the presence of a Lewis acid is continued until the provisions represented by the following formulas (IV) and (V) be satisfied;

$$Mn_4 \geq Mn_3 \qquad (IV)$$

(wherein $Mn_3$ represents the number average molecular weight of the isobutylene-based polymer used; and $Mn_4$ represents the number average molecular weight of the final isobutylene-based polymer at the time of the reaction completion)

$$[Mw/Mn]_4/[Mw/Mn]_3 \geq 1.1 \qquad (V)$$

(wherein $[Mw/Mn]_3$ represents the molecular weight distribution (the ratio of the weight average molecular weight/the number average molecular weight) of the isobutylene-based polymer used; $[Mw/Mn]_4$ represents the molecular weight distribution (the ratio of the weight average molecular weight/the number average molecular weight) of the final isobutylene-based polymer at the time of the reaction completion).

DETAILED DESCRIPTION OF THE INVENTION

Figure 1:
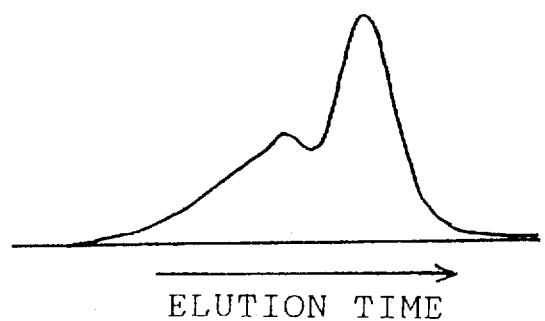
FIG. 1 is a gel-permeation chromatogram of the isobutylene-based polymer of Example 1 in accordance with the present invention.

The present invention will now be explained in detail.

The isobutylene-based polymer of the present invention is encompassed within the polymer of cationically polymerizable monomers, principally composed of isobutylene or a combination of isobutylene and a styrene-series monomer. Thus, the isobutylene-based polymer of the present invention contains a unit [—$CH_2$—$C(CH_3)_2$—]derived from isobutylene as the essential structural unit and may optionally contain another structural unit such as a unit derived from a styrene-series monomer. Preferably, the styrene-series monomer may be styrene of itself or a styrene derivative having at least one hydrogen atom at β-position. The styrene derivative having at least one hydrogen atom at β-position includes methylstyrenes such as o-, m- or p-methylstyrene, α-methylstyrene and β-methylstyrene; dimethylstyrenes such as 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, and β-methyl-p-methylstyrene; trimethylstyrenes such as 2,4,6-trimethylstyrene, α-methyl-2,6-dimethylstyrene, α-methyl-2,4-dimethylstyrene, β-methyl-2,6-dimethylstyrene, and β-methyl-2,4-dimethylstyrene; o-, m- or p-chlorostyrene; dichlorostyrenes such as 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, and β-chloro-p-chlorostyrene; trichlorostyrenes such as 2,4,6-trichlorostyrene, α-chloro-2,6-dichlorostyrene, α-chloro-2,4-dichlorostyrene, β-chloro-2,6-dichlorostyrene, and β-chloro-2,4-dichlorostyrene; o-, m- or p-t-butylstyrene; o-, m- or p-methoxystyrene; o-, m- or p-chloromethylstyrene; o-, m- or p-bromomethylstyrene and the like.

If the isobutylene-based polymer of the present invention has the elastomeric property (rubber-like elasticity), the polymer readily exerts its marked effect of improving the durability and mechanical performance of the molded articles therefrom. Preferably from such respect, 50 mol % or more of the units being derived from the cationically polymerizable monomers and composing the isobutylene-based polymer should be occupied by the isobutylene unit. The isobutylene-based polymer of the present invention is more preferably a block copolymer having at least one polymer block composed of a cationically polymerizable monomer unit principally composed of the isobutylene unit and at least one polymer block composed of a cationically polymerizable monomer unit principally composed of a styrene-series monomer unit. Most preferably, such block copolymer contains the isobutylene unit within a range of 50 to 90 mol % to the total cationically polymerizable monomer units and the styrene-series monomer unit within a range of 50 to 10 mol % to the total cationically polymerizable monomer units.

Additionally, the isobutylene-based polymer of the present invention may contain a lower ratio (preferably a ratio of 10 mol % or less to the total cationically polymerizable monomer units composing the isobutylene-based polymer) of a unit derived from a cationically polymerizable monomer different from isobutylene and the styrene-series monomer. The cationically polymerizable monomer different from isobutylene and the styrene-series monomer includes vinyl ethers such as methyl vinyl ether, ethyl vinyl ether, isobutyl vinyl ether, 2-chloroethyl vinyl ether, and 2-methoxyethyl vinyl ether; olefins such as ethylene, propylene, 3-methyl-1-butene, and 4-methyl-1-pentene; indene; acenaphthylene; N-vinylcarbazole and the like.

The molecular weight distribution of the isobutylene-based polymer of the present invention is substantially continuous on a chromatogram (gel-permeation chromatogram) by gel-permeation chromatography (GPC). In other words, it means that the isobutylene-based polymer of the present invention is substantially continuously eluted from the start to completion of the elution of the polymer during GPC analysis. Hence, the isobutylene-based polymer of the present invention has substantially only one mountain on a gel-permeation chromatogram, but the mountain may have a plurality of peaks.

Essentially, the isobutylene-based polymer of the present invention should have a molecular weight within a range of 10,000 to 500,000 at the highest peak on a gel-permeation chromatogram. If the molecular weight is less than 10,000, the durability and mechanical performance of the molded articles from the isobutylene-based polymer are not satisfactory. If the molecular weight is above 500,000, the melt viscosity of the isobutylene-based polymer gets exceedingly high so that the moldability gets unsatisfactory. The molecular weight at the highest peak is preferably in a range of 20,000 to 200,000, because all of the moldability and the durability and mechanical performance of the molded articles are generally good in the range.

Provided that the length of the elution time in the lower molecular region of the mountain from the highest peak is designated as "(a)" and the length of the elution time in the higher molecular region of the mountain from the highest peak is designated as "(b)", furthermore, the isobutylene-based polymer of the present invention has a ratio of (b)/(a) of not less than 1.3. If the (b)/(a) ratio is less than 1.3, the durability and mechanical performance of the final molded articles may be unsatisfactory. The ratio (b)/(a) may preferably be not less than 1.4, more preferably not less than 1.5, from the respect of imparting good properties to the final molded articles. The upper limit of the ratio (b)/(a) is preferably not above 4.0, with no specific limitation, because the melt fluidity will be deteriorated at a too large such ratio which may potentially cause the deterioration of the moldability as well.

The isobutylene-based polymer of the present invention may have a ratio of weight average molecular weight (Mw) to number average molecular weight (Mn), ie.[Mw/Mn], preferably within a range of 1.3 to 3.0, more preferably within a range of 1.3 to 2.5 on the basis of GPC analysis, but with no specific limitation, because both the moldability and the physical properties of the molded articles may be enhanced within the range in particular.

The isobutylene-based polymer of the present invention may be molded into a variety of molded articles, such as extrusion molded articles for example in the forms of film, sheet and tube and injection molded articles such as those products of a given three-dimensional shape, by melt molding such as extrusion molding, injection molding and press molding. Experimentally, the melting temperature during melt molding is readily determined appropriately, with no specific limitation, depending on the type of an isobutylene-based polymer to be used, the type of the molding, and the shape of an objective molding article. For extrusion molding for example, a temperature in a range of 150° C. to 300° C. may be selected. For subjecting the isobutylene-based polymer of the present invention to molding, addition may be made preliminarily, if desired, of a mineral oil softener (eg. paraffin oil, naphthene oil, etc.) for improving the fluidity during molding process; a hydrocarbon softener for imparting flexibility; a mineral filler (eg. calcium carbonate, alumina, talc, carbon black, titanium oxide, silica, clay, barium sulfate, magnesium carbonate, mica, zeolite, ferrite, etc.) for the purposes of imparting heat resistance or weatherability and filling; fiber reinforcing materials (eg. mineral fiber such as glass fiber and carbon fiber, organic fibers, etc.); thermal stabilizers, antioxidants, photo-stabilizers, antistatic agents, foaming agents and the like. Similarly, other polymers may be blended together, such as styrene-ethylene propylene-styrene block copolymer (SEPS), styrene-ethylene propylene block copolymer (SEP), styrene-ethylenebutylene-styrene block copolymer (SEBS), ethylene-propylene-non-conjugated diene copolymer (EPDM), polybutene, and standard polyisobutylene.

Molded articles comprising the isobutylene-based polymer, as described above, have great durability and higher mechanical performance. When the isobutylene-based polymer is an isobutylene-based polymer with elastomeric property, represented by a block copolymer having at least one polymer block composed of a cationically polymerizable monomer unit principally composed of the isobutylene unit and having at least one polymer block composed of a cationically polymerizable monomer unit principally composed of a styrene-series monomer unit, these characteristic properties are so effectively exerted that the molded articles therefrom acquire excellent mechanical performance such as greater elongation performance and tensile strength and that the articles are excellent in terms of compression set property, in particular.

The isobutylene-based polymer of the present invention can be produced by the process (i) or (ii) described above.

Explanation will be made hereinbelow of the process (i), namely the process of producing an isobutylene-based polymer using as a raw material isobutylene or a combination of isobutylene and a styrene-series monomer.

The reaction of cationically polymerizable monomers principally composed of isobutylene or a combination of isobutylene and a styrene-series monomer, in the presence of a polymerization initiating system. comprising the compound with the group represented by the formula (I) and a Lewis acid, is preferably effected, substantially following the manner of living cationic polymerization of cationically polymerizable monomers under the conditions for conventional living cationic polymerization, up to an intermediate stage (preferably, up to the time when the conversion of the cationically polymerizable monomers reaches at least 95%).

In the formula (I), the alkyl group independently represented by $R^1$ and $R^2$ includes for example methyl group, ethyl group and the like; the aryl group includes for example phenyl group, tolyl group and the like; and the aralkyl group includes for example benzyl group and the like. In the formula (I), the acyloxyl group represented by X includes for example acetoxyl group, propionyloxyl group and the like; the alkoxyl group includes for example methoxyl group, ethoxyl group and the like; and the halogen atom includes for example chlorine atom, bromine atom and the like. The compound with the group represented by the formula (I) includes for example an ether with a tertiary carbon atom bound with oxygen atom, a halogenated hydrocarbon with a tertiary carbon atom bound with a halogen atom, a tertiary alcohol, and the ester of carboxylic acid with a tertiary alcohol. Specific examples of the compound having the group represented by the formula (I) include the carboxylate ester of a tertiary alcohol, for example α-cumyl esters such as 2-acetoxy-2-phenylpropane and 2-propionyloxy- 2-phenylpropane; an ether with a tertiary carbon atom bound with oxygen, for example α-cumyl ethers such as 1,4-bis(1-methoxy-1-methylethyl)benzene; a halogenated hydrocarbon with a tertiary carbon atom bound with a halogen atom, for example α-cumyl chlorides such as 2-chloro-2-phenylpropane, 1,4-bis(1-chloro-1-methylethyl) benzene, and 1,3,5-tris(1-chloro-1-methylethyl)benzene; 2-chloro-2,4,4-trimethylpentane; and 2,6-dichloro-2,4,4,6-tetramethylheptane; a tertiary alcohol such as 1,4-bis(1-hydroxy-1-methylethyl)benzene, and 2,6-dihydroxy-2,4,4,6-tetramethylheptane.

As the Lewis acid, preferably, use is made of a metal halide. Specific examples of the metal halide includes for example halogenated boron compounds such as boron trichloride, boron trifluoride, and boron trifluoride diethyl etherate; halogenated titanium compounds such as titanium tetrachloride, titanium tetrabromide, and titanium tetraiodide; halogenated tin compounds such as tin tetrachloride, tin tetrabromide, and tin tetraiodide; halogenated aluminium compounds such as aluminum trichloride, an alkylaluminium dichloride, and a dialkylaluminium chloride; halogenated antimony compounds such as antimony pentachloride, and antimony pentafluoride; halogenated tungsten compounds such as tungsten pentachloride; halogenated molybdenum compounds such as molybdenum pentachloride; and halogenated tantalum compounds such as tantalum pentachloride. As the Lewis acid, use may be made of metal alkoxides such as a titanium tetraalkoxide. The Lewis acid may preferably be used within a range of 1 to 100 times in molar ratio the group represented by the formula (I).

The cationically polymerizable monomers to be used in the process (i) are principally composed of isobutylene or a combination of isobutylene and a styrene-series monomer. Preferable examples of such styrene-series monomer are as described above with respect to the isobutylene-based polymer of the present invention.

Because the final isobutylene-based polymer readily exhibits markedly the effect of improving the durability and mechanical performance of the molded articles therefrom if the polymer has elastomeric property (rubber-like elasticity), 50 mol % or more of the cationically polymerizable monomers to be used is therefore preferably occupied by isobutylene. For the production of a block copolymer with elastomeric property which can exert the aforementioned effect significantly, it is particularly preferable that the cationically polymerizable monomers should be principally composed of isobutylene and a styrene-series monomer; a cationically polymerizable monomer principally composed of isobutylene and a cationically polymerizable monomer principally composed of a styrene-series monomer should be added to a reaction system independently with time lag, for promoting polymerization in such a manner that these monomers individually form independent polymer blocks. More preferably, isobutylene is used within a range of 50 to 90 mol % to the total amount of the cationically polymerizable monomers while the styrene-series monomer is used within a range of 50 to 10 mol % to the total amount of the cationically polymerizable monomers.

One example of the process of adding the cationically polymerizable monomer principally composed of isobutylene and the cationically polymerizable monomer principally composed of a styrene-series monomer to a reaction system in an independent manner with time lag, comprises the reaction of the cationically polymerizable monomer principally composed of isobutylene followed by addition of the cationically polymerizable monomer principally composed of a styrene-series monomer into the reaction system, wherein the subsequently added cationically polymerizable monomer principally composed of the styrene-series monomer initiates its polymerization reaction at the active end of the living polymer composed of the cationically polymerizable monomer unit principally composed of the isobutylene unit (—CH$_2$—C(CH$_3$)$_2$—), the living polymer having been produced by the polymerization of the cationically polymerizable monomer principally composed of isobutylene, to form a polymer block composed of the cationically polymerizable monomer unit principally composed of the styrene-series monomer unit, in conjugation with the polymer block composed of the cationically polymerizable monomer unit principally composed of the isobutylene unit. In this case, furthermore, it is at the time of substantially total consumption of the preliminarily used cationically polymerizable monomers principally composed of isobutylene (preferably at the time of the conversion of the preliminarily used cationically polymerizable monomers reaching 95% or more) when the cationically polymerizable monomer principally composed of the styrene-series monomer should be added.

Additionally, a cationically polymerizable monomer different from isobutylene and the styrene-series monomer, may be used in combination at a lower level (preferably at 10 mol % or less to the total amount of the cationically polymerizable monomers). Examples of such cationically polymerizable monomers available for the combination are as described above for the isobutylene-based polymer of the present invention.

As has been described above, the reaction procedures for the process (i) should be substantially for the purpose of living cationic polymerization of cationically polymerizable monomers, preferably under the same reaction conditions as those for conventional living cationic polymerization of isobutylene and the like, up to the intermediate stage, namely until the time comes wherein the conversion of the cationically polymerizable monomers reaches at least 95%. The same temperature conditions as those for conventional living cationic polymerization of isobutylene and the like, may be employed for the above polymerization, with no specific limitation; the temperature is generally within a range of −150° C. to −20° C.

If necessary, an organic Lewis base may be added into the polymerization system, including esters such as ethyl acetate; amines such as triethylamine; pyridines such as pyridine; amides such as N,N-dimethylacetamide; ethers such as tetrahydrofuran and dioxane; sulfinyl compounds such as dimethyl sulfoxide; and ketones such as acetone and methyl ethyl ketone. The organic Lewis base may be used within a range of preferably 0.1 to 100 times, more preferably 0.5 to 2 times in molar ratio the group represented by the formula (I).

The polymerization according to the process (i) is preferably effected in a homogenous solution system in an organic solvent, and as such organic solvent, use may be made of those applicable for conventional cationic polymerization. Specific examples of the organic solvent include an aliphatic hydrocarbon such as hexane, heptane, cyclohexane, and methylcyclohexane; an aromatic hydrocarbon such as benzene, toluene and xylene; and a halogenated hydrocarbon such as methyl chloride, ethyl chloride, methylene chloride, ethylene dichloride, and chlorobenzene, in the form of a single solvent or in a mixture solvent.

For the reaction of cationically polymerizable monomers in the presence of a polymerization initiating system comprising the compound (initiator compound) having the group represented by the formula (I) and a Lewis acid according to the process (i), the sequence of adding the initiator compound, the Lewis acid and the cationically polymerizable monomers and the like into a reaction system is with no specific limitation, but such a sequence should be preferably employed, that the Lewis acid should be brought into contact with the cationically polymerizable monomers at the final stage. So as to suppress side reactions thereby enhancing the desired polymerization, moisture is preferably not contaminated into the reaction system as might be possible. Thus, it is preferable to sufficiently dry up reactors, raw materials, organic solvents and the like prior to use.

According to the process (i), the conversion of the cationically polymerizable monomers should be controlled not less than 95%. If the reaction is terminated at the time when the conversion is still less than 95%, the final isobutylene-based polymer cannot exert great durability and mechanical performance in the molded articles therefrom. The conversion of the cationically polymerizable monomers in the reaction system can be determined, on the basis of the supply of the cationically polymerizable monomers and the generation of the polymer.

According to the process (i), preferably, the polymerization is carried out by the conventional process until the conversion of the cationically polymerizable monomers reaches 95% or more as has been described above, but it is of importance to continue a reaction thereafter under specific conditions.

As the reaction procedure at the time when the conversion of the cationically polymerizable monomers reaches 95% or more, preferably, use is made of a mechanical agitation means for mixing together the reaction mixture at a temperature within a range of −150° C. to +50° C.

According to the process (i), it should be controlled that both the provisions represented by the formulas (II) and (III) be satisfied during the reaction in the region where the conversion of the cationically polymerizable monomers is 95% or more.

The provision represented by the formula (II) means that the reaction procedure should be continued essentially until the number average molecular weight (Mn$_2$) of the final isobutylene-based polymer exceeds the number average molecular weight (Mn$_1$) of the resulting isobutylene-based polymer at the time when the conversion of the cationically polymerizable monomers is 95%. If the reaction is terminated when Mn$_2$ is equal to or less than Mn$_1$, the final isobutylene-based polymer cannot exert satisfactory effect of improving the durability and mechanical performance of the molded articles therefrom. The number average molecular weight (Mn$_i$) of the resulting isobutylene-based polymer at the time of the conversion of 95% is preferably within a range of 10,000 to 200,000, with no specific limitation, because such polymer readily exerts the effect of improving the durability and mechanical performance of the molded articles therefrom.

The provision represented by the formula (III) means that the reaction procedure should be continued essentially until the molecular weight distribution ([Mw/Mn]$_2$) of the final isobutylene-based polymer is 1.1 times or more the molecular weight distribution ($[Mw/Mn]_1$) of the resulting isobutylene-based polymer at the time when the conversion of the cationically polymerizable monomers is 95%. If the reaction is terminated when $[Mw/Mn]_2$ is less than 1.1 times $[Mw/Mn]_1$, the final isobutylene-based polymer cannot exert satisfactory effect of improving the durability and mechanical performance of the molded articles therefrom. So as to make the improvement effect particularly distinct, the reaction procedure is preferably continued until the ratio $[Mw/Mn]_2/[Mw/Mn]_1$ reaches 1.3 or more. The ratio $[Mw/Mn]_2/[Mw/Mn]_1$ has no specific upper limit from the respect of the effect of improving the durability and mechanical performance of the molded articles, but a too large such ratio causes the deterioration of the melt fluidity of the final isobutylene-based polymer, causing difficulty in melt molding. Thus, such ratio preferably does not exceed 3.

The molecular weight distribution ($[Mw/Mn]_1$) of the resulting isobutylene-based polymer at the conversion of 95% is preferably within a range of 1.0 to 1.5, with no specific limitation, because in that case, the final isobutylene-based polymer readily exerts the effect of improving the durability and mechanical performance in the molded articles therefrom.

The $Mn_1$ and $[Mw/Mn]_1$ of the resulting isobutylene-based polymer in the reaction system can be determined on the basis of the results of GPC analysis of the resulting isobutylene-based polymer in the form of a sample collected from the reaction system. For example, collecting samples of the resulting isobutylene-based polymer from the reaction system over time during the reaction, determining the number average molecular weights of the individual samples by GPC analysis, plotting the number average molecular weights of the individual samples vs the conversions of the cationically polymerizable monomers, $Mn_1$ can be determined as the number average molecular weight at the conversion of 95% by interpolation on the graph. Collecting a plurality of samples of the resulting isobutylene-based polymer over time during the reaction, individually determining the molecular weight distribution (Mw/Mn) of the samples by GPC analysis, plotting the Mw/Mn of each sample vs the conversions of the cationically polymerizable monomers, $[Mw/Mn]_1$ can be determined as the ratio Mw/Mn at the conversion of 95% by interpolation on the graph.

When the conversion of the cationically polymerizable monomers is 95% or more, supplementary. Lewis acid may be added within a range of 100 times or less in molar ratio the Lewis acid having been added to the reaction system for the purpose of forming the initiating system. Representative examples of the Lewis acid applicable in such case include the specific examples as described above with respect to the Lewis acid composing the polymerization initiating system. The reaction system is preferably a homogenous solution system in an organic solvent, as described for the polymerization. Specific examples of the organic solvent include those described above as the specific examples of the organic solvent for use in the polymerization. In the reaction system, an organic Lewis base as described above for the polymerization may be present. So as to promote the reaction desirable for the preparation of a product with a higher molecular weight, preferably, substantially no moisture should be present in the reaction system. Therefore, reactors, organic solvents and the like may preferably be dried sufficiently, prior to fresh use. Therefore, in the case of the polymerization having been carried out so far at a temperature within a range of $-150°$ C. to $-20°$ C., methodologically, the reaction procedure may be continued even at a conversion of 95% or more while maintaining the reaction conditions including the reaction temperature as they have been until the reaction reaches a stage where the provisions represented by the formulas (II) and (III) can be satisfied, and then, the reaction should be terminated at an appropriate timing.

According to the process (i), the reaction under the controls so as to satisfy the provisions represented by the formulas (II) and (III) when the conversion of the cationically polymerizable monomers amounts to 95% or more is generally continued for a period within a range of 2 to 20 hours starting the time when the conversion reaches 95%, but with no specific limitation. The reaction may be carried out while measuring continuously or discontinuously the molecular weight distribution (Mw/Mn) and number average molecular weight of the resulting isobutylene-based polymer present in the reaction system until these given provisions are all met. In the region at a conversion of 95% or more, generally, the molecular weight distribution and number average molecular weight of the resulting isobutylene-based polymer in the reaction system are likely to increase over the course of the duration of the reaction.

According to the process (i), the reaction is terminated at a desired stage in the region with the provisions of the formulas (II) and (III) satisfied, following the same manner as in the conventional living cationic polymerization, to separate the final polymer. At such desired stage, for example, a protic compound such as methanol, ethanol and water, is added as a reaction terminator to the reaction system, and the resulting reaction mixture is washed in an aqueous liquid such as water, an aqueous alkaline solution and the like, to remove the Lewis acid and the like, followed by reprecipitation of the resulting solution with a poor solvent such as methanol or by azeotropic process after steam introduction for removal of the solvent, thereby separating a desired, isobutylene-based polymer with a far higher molecular weight.

Description will now be presented hereinbelow about the process (ii) of producing the isobutylene-based polymer of the present invention, namely the process of producing an isobutylene-based polymer with a far higher molecular weight using as a starting compound an isobutylene-based polymer having at the end of the molecular main chain an acyloxyl group, an alkoxyl group, hydroxyl group or a halogen atom.

As the starting compound, use is made of the isobutylene-based polymer composed of cationically polymerizable monomer units, having the molecular main chain principally composed of the isobutylene unit or a combination of the isobutylene unit and a styrene-series monomer unit and additionally containing at the end of the molecular main chain an acyloxyl group, an alkoxyl group, hydroxyl group or a halogen atom. Representative examples of the acyloxyl group, the alkoxyl group and the halogen atom which may be contained in the end of the molecular main chain, include those individually exemplified for the acyloxyl group, the alkoxyl group and the halogen atom represented by the "X" of the formula (I). The acyloxyl group, the alkoxyl group, the hydroxyl group or the halogen atom at the end of the molecular main chain is readily integrated into a material with a far higher molecular weight, and is also useful for the exertion of the effect of improving the durability and mechanical performance of the molded articles. Therefore, they may be contained at preferably 0.5 or more, more preferably 0.8 or more (group(s) or atom(s)) per one molecule on average. Because the end of the molecular main chain with an acyloxyl group, an alkoxyl group, hydroxyl group or a halogen atom is readily exposed to action to prepare a product with a far higher molecular weight, to promote the exertion of the effect of improving the durability and mechanical performance of the molded articles, the end preferably has a chemical structure represented by the formula (VI) or the formula (VII);

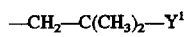
$$—CH_2—C(CH_3)_2—Y^1 \qquad (VI)$$

(wherein $y^1$ represents an acyloxyl group, an alkoxyl group, hydroxyl group or a halogen atom);

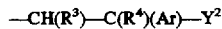
$$—CH(R^3)—C(R^4)(Ar)—Y^2 \qquad (VII)$$

(wherein $R^3$ and $R^4$ individually represent hydrogen atom or an alkyl group; Ar represents phenyl group which may or may not have a substituent substantially inactive to the reaction for preparing a product with a far higher molecular weight; $y^2$ represents an acyloxyl group, an alkoxyl group, hydroxyl group or a halogen atom). In the formula (VII), the alkyl group represented by $R^3$ and $R^4$ includes for example methyl group, ethyl group and the like. The substituent which is substantially inactive to the reaction and may or may not be contained in the phenyl group in the Ar of the formula (VII) includes for example an alkyl group such as methyl group, ethyl group and the like; a halogen atom such as chlorine atom, bromine atom and the like; an alkoxyl group such as methoxyl group and the like; and a halogenomethyl group such as chloromethyl group, bromomethyl group and the like.

The principal component of the cationically polymerizable monomer units (the structural units derived from the cationically polymerizable monomers) substantially composing the molecular main chain of the isobutylene-based polymer to be used as the starting material, is the isobutylene unit (the structural unit derived from isobutylene) or a combination of the isobutylene unit and the styrene-series monomer unit (the structural unit derived from the styrene-series monomer). According to the process (ii), the isobutylene-based polymer with a far higher molecular weight from the elastomeric isobutylene-based polymer used, readily exerts the effect of improving the durability and mechanical property in the molded articles therefrom. From such respect, preferably, 50 mol % or more of the total cationically polymerizable monomer units in the isobutylene-based polymer to be used should be occupied by the isobutylene unit. For remarkable exertion of the effect in particular, the isobutylene-based polymer to be used is preferably a block copolymer containing in the molecular main chain thereof at least one polymer block composed of the cationically polymerizable monomer unit principally composed of the isobutylene unit and at least one polymer block composed of the cationically polymerizable monomer unit principally composed of the styrene-series monomer unit, and more preferably, a block copolymer containing the isobutylene unit within a range of 50 to 90 mol % to the total cationically polymerizable monomer units and the styrene-series monomer unit within a range of 50 to 10 mol % to the total cationically polymerizable monomer units.

Furthermore, the isobutylene-based polymer to be used may contain a unit derived from another cationically polymerizable monomer, different from the isobutylene monomer or the styrene-series monomer, provided that the unit is used at a lower ratio (preferably, at 10 mol % or less to the cationically polymerizable monomer units in total). Specific examples of such another cationically polymerizable monomer are as described above regarding the isobutylene-based polymer of the present invention.

According to the process (ii), preferably, the molecular main chain of the isobutylene-based polymer to be used as the starting raw material is substantially in a linear chain or a star shape. If the number of branches in the molecular main chain is too large, the melt fluidity of the final isobutylene-based polymer with a far higher molecular weight is deteriorated, potentially involving poor moldability thereof.

The number average molecular weight ($Mn_3$) of the isobutylene-based polymer to be used as the starting raw material is with no specific limitation, but preferably within a range of 10,000 to 200,000, because such polymer can readily exert the effect of improving the durability and mechanical performance in the molded articles from the finally resulting polymer. The molecular weight distribution ($[Mw/Mn]_3$) of the isobutylene-based polymer to be used as the starting material is with no specific limitation, but preferably within a range of 1.0 to 1.5 because the polymer can exert the effect of improving the durability and mechanical performance of the molded articles from the final polymer.

According to the process (ii), the reaction for imparting a high molecular weight to the isobutylene-based polymer is carried out in the presence of a Lewis acid. As the Lewis acid, preferably, use is made of a metal halide as illustrated for the process (i). Also, use may be made of a metal alkoxide such as a titanium tetraalkoxide. The Lewis acid is preferably used at a ratio of 0.1 to 100 times in molar ratio the total sum of the functional groups selected from an acyloxyl group, an alkoxyl group, hydroxyl group and a halogen atom and contained in the end of the molecular main chain of the isobutylene-based polymer to be used.

For the reaction for imparting a high molecular weight to the isobutylene-based polymer by the process (ii), preferably, use is made of a mechanical agitation means for mixing the starting isobutylene-based polymer at a temperature within a range of −150° C. to +50° C. It should be controlled that both the provisions represented by the formulas (IV) and (V) be satisfied.

The provision represented by the formula (IV) means that the reaction procedure should be continued essentially until the number average molecular weight ($Mn_4$) of the finally resulting isobutylene-based polymer exceeds the number average molecular weight ($Mn_3$) of the isobutylene-based polymer used as the raw material compound. If the reaction is terminated when $Mn_4$ is equal to or less than $Mn_3$, the final isobutylene-based polymer cannot exert satisfactorily the effect of improving the durability and mechanical performance of the molded articles therefrom.

The provision represented by the formula (V) means that the reaction procedure should be continued essentially until the molecular weight distribution ($[Mw/Mn]_4$) of the finally resulting isobutylene-based polymer is 1.1 times or more the molecular weight distribution ($[Mw/Mn]_3$) of the isobutylene-based polymer used as the raw material compound. If the reaction is terminated when $[Mw/Mn]_4$ is less than 1.1 times $[Mw/Mn]_3$, the final isobutylene-based polymer cannot exert satisfactorily the effect of improving the durability and mechanical performance of the molded articles therefrom. So as to make the improvement effect particularly distinct, the reaction procedure is preferably continued until the ratio $[Mw/Mn]_4/[Mw/Mn]_3$ reaches 1.3 or more. The ratio $[Mw/Mn]_4/[Mw/Mn]_3$ is with no specific upper limit from the respect of the effect of improving the durability and mechanical performance of the molded articles, but a too large such ratio causes the deterioration of the melt fluidity of the final isobutylene-based polymer, with difficulty in melt molding. Thus, the ratio preferably is not above 3.

The number average molecular weight and molecular weight distribution of the isobutylene-based polymer to be used as the raw material compound and those of the final isobutylene-based polymer in the reaction system, can be determined by the results of GPC analysis. The $Mn_4$ and $[Mw/Mn]_4$ are the number average molecular weight and molecular weight distribution (Mw/Mn), respectively, of a collected sample of the resulting isobutylene-based polymer from the reaction system at the time of the reaction termination, both determined independently by GPC analysis.

According to the process (ii), the reaction system is preferably a homogeneous solution system in an organic solvent. Specific examples of the organic solvent include the specific examples of the organic solvent to be used for the polymerization according to the process (i). So as to promote the desired reaction for preparing a matter with a far higher molecular weight, preferably, substantially no moisture should be present in the reaction system. Therefore, reactors, organic solvents and the like may preferably be dried sufficiently prior to their use.

The reaction time of the reaction under controls so as to satisfy the provisions represented by the formulas (IV) and (V), is with no specific limitation. The reaction may be carried out generally for a period within a range of 2 to 20 hours, while measuring continuously or discontinuously the molecular weight distribution (Mw/Mn) and number average molecular weight of the resulting isobutylene-based polymer present in the reaction system until these meet the given provisions. Generally, the molecular weight distribution and number average molecular weight of the resulting isobutylene-based polymer in the reaction system are likely to increase over the course of the reaction duration.

According to the process (ii), the reaction is terminated at a desired stage in the region consistent with the provisions of the formulas (IV) and (V), following the same manner as in the conventional living cationic polymerization, to separate the final polymer. At such desired stage, for example, a protic compound such as methanol, ethanol and water, is added as a reaction terminator to the reaction system, and the resulting reaction mixture is washed in an aqueous liquid such as water, an aqueous alkaline solution and the like, to remove the Lewis acid, followed by reprecipitation of the resulting solution with a poor solvent such as methanol or by azeotropic process after steam introduction for removal of the solvent, thereby separating a desired, isobutylene-based polymer with a far higher molecular weight.

The isobutylene-based polymer produced by the process (i) or (ii) exerts the effect of improving the durability and mechanical performance in the molded articles, compared with the isobutylene-based polymer in the shape of linear chain or star which is produced only from the respect of the completion of monomer polymerization according to the conventional living cationic polymerization. The improved properties can be more effectively exhibited by the isobutylene-based polymer with elastomeric property, which is illustrated by a block copolymer containing at least one polymer block composed of a cationically polymerizable monomer unit principally composed of the isobutylene unit and at least one polymer block composed of a cationically polymerizable monomer unit principally composed of the styrene-series monomer unit. The processes (i) and (ii) are readily carried out because of no significant difference on operation between these processes and the conventional living cationic polymerization.

It has not completely been elucidated yet, the reason why the number average molecular weight and molecular weight distribution (Mw/Mn) increase via the reaction according to the processes (i) and (ii), but the reason may be as follows. The isobutylene-based polymer at a stage where the conversion of the cationically polymerizable monomers reaches 95% or more around 100% according to the process (i), and the isobutylene-based polymer with an acyloxyl group, an alkoxyl group, hydroxyl group or a halogen atom at the end of the molecular main chain to be used according to the process (ii), form individually carbocations at the ends of the molecular main chains thereof in the reaction systems, and some molecules of these isobutylene-based polymers form a carbon-carbon double bond at the ends of the molecular main chains through the elimination of the proton form of the hydrogen atom at β-position to the carbocation. An isobutylene-based polymer molecule having the thus formed carbon-carbon double bond at the end of the molecular main chain initiates the addition reaction onto other isobutylene-based polymers having carbocations at the ends of the molecular main chains, leading to the generation of a higher molecular polymer molecule in the form of the two polymer molecules being coupled. Because the coupled polymer molecules and uncoupled polymer molecules are both present, the final isobutylene-based polymer on the whole acquires a higher number average molecular weight with a broader molecular weight distribution (Mw/Mn).

The possible mechanism for the generation of the coupled polymer molecules is depicted in the formulas (VIII) and (IX), which show the cases of the isobutylene-based polymer with the isobutylene unit present at the end of the molecular main chain and the isobutylene-based polymer with the styrene unit present at the end of the molecular main chain, respectively.

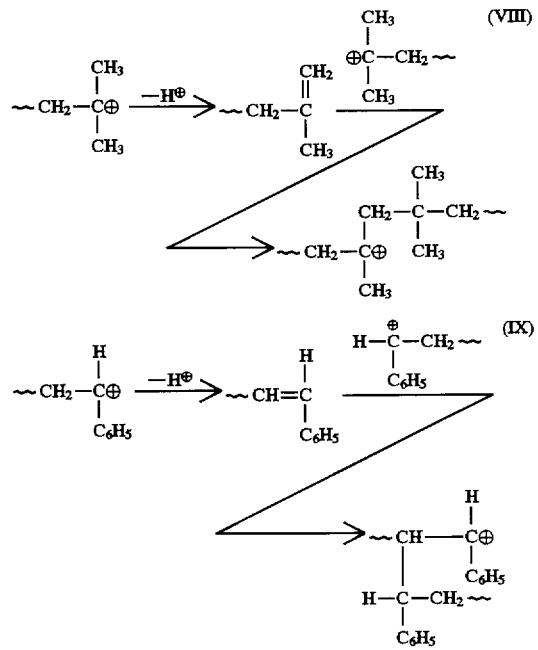

The present invention will now be described in detail in examples. But the present invention is not limited to these examples.

The conversion of the cationically polymerizable monomers was determined on the measured polymer content in a solution sample collected from the reaction system.

Using standard polystyrene as a marker, the number average molecular weight (Mn) and molecular weight distribution [Mw (weight average molecular weight)/Mn (number average molecular weight)] of the isobutylene-based polymer used, and those of the resulting isobutylene-based polymer in the reaction system and the final isobutylene-based polymer, were determined by GPC analysis under the following conditions.

Apparatus; Liquid Chromatograph Type LC-6A (manufactured by Shimadzu, Co.)

Eluent; tetrahydrofuran

Flow rate; 1 ml/min

Temperature; 55° C.

Column; Shim-pack, GPC 802, 804, 806 (manufactured by Shimadzu, Co.)

Detector; Refractive index detector.

So as to reduce the error on analytical process by gel-permeation chromatography, the base line is corrected as follows, which is designated "corrected base line". Distance D1 between line L1 as the base line elongation on the side of the lower molecular weight region from the foot of the mountain on a gel-permeation chromatogram and line L1' parallel to the line L1 and in tangent to the mountain, was first determined. Parallel to the line L1, line L1" was drawn, being positioned between L1 and L1' and spaced by the distance 0.01×D1 from the L1. The intersection available in the lowest molecular weight region is designated "intersection A" among the intersections of the L1" and the mountain. Similarly, distance D2 between line L2 as the base line elongation on the side of the higher molecular weight region from the foot of the mountain and line L2' parallel to the line L2 and in tangent to the mountain, was determined. Parallel to the line L2, line L2" was drawn, being positioned between L2 and L2' and spaced by the distance 0.01×D2 from the L2. The intersection available in the highest molecular weight region is designated "intersection B" among the intersections of the L2" and the mountain. The line passing through the intersections A and B, corresponds to the "corrected base line". A point on the mountain with the longest distance from the corrected base line, is designated as "highest peak". Also, the absolute difference in elution time between up to the point A and up to the highest peak is designated as [length "a" of the elution time in the lower molecular weight region of the mountain from the highest peak]; similarly, the absolute difference in elution time between up to the point B and up to the highest peak is designated as [length "b" of the elution time in the higher molecular weight region of the mountain from the highest peak].

The number average molecular weight at the time of the conversion of the cationically polymerizable monomers being 95% was determined by an interpolation process, after plotting on graph the number average molecular weight of the resulting isobutylene-based polymer vs the conversion of the cationically polymerizable monomer over time. The molecular weight distribution at the time of the conversion of the cationically polymerizable monomers being 95% was similarly determined by an interpolation process, after plotting the molecular weight distribution of the resulting isobutylene-based polymer vs the conversion of the cationically polymerizable monomer over time.

Thermally pressing the isobutylene-based polymer used and the resulting isobutylene-based polymer at a temperature of 200° C. to prepare sheets, tensile tests of the prepared sheets were carried out, by means of an autograph Type AG 2000 B manufactured by Shimadzu, Co., according to JIS-K 6301. The tensile strength, elongation at break and 100% modulus were determined on the basis of the test results. Using similarly prepared sheets, the compression set was measured after the thermal processing at 70° C. for 22 hours and at 100° C. for 22 hours, according to JIS-K 6301. The melt viscosity (in Pa.s) of the resulting isobutylene-based polymer was measured with a capillary flow meter Capillograph Type 1C manufactured by Toyo Seiki Co. under the conditions of a temperature of 230° C. and a shear rate of 100 (l/s). Additionally, a given amount of the isobutylene-based polymer (produced by repeating the same experimental process if desired) was subjected to a film preparation test by melt-extrusion molding with a film machine Plastomill (manufactured by Toyo Seiki, Co.) under the conditions of a temperature of 230° C., a screw revolution speed of 130 rpm, and a take-up speed of 2 to 3 m/min. The film preparation test was evaluated according to the following criteria standards; A: continuous generation of uniform film; B: frequent occurrence of film break during take-up C: less discharge from T die, with the result of no generation of uniform film.

EXAMPLE 1

In a reaction vessel with an agitator were charged methylene chloride (800 ml) a methmethylcyclohexane (1200 ml), both preliminarily dehydrated on molecular sieves 4A, followed by individual additions of 1,4-bis(1-chloro-1-methylethyl) benzene (2.0 g; 8.7 mmol), 2,6-dimethylpyridine (0.98 g; 9.1 mmol), pyridine (1.38 g; 17.4 mmol) and isobutylene (210 g). By adding then titanium tetrachloride (12.3 g; 65 mmol) to the resulting mixture at −78° C., the reaction was initiated and continued under agitation of the resulting solution at the same temperature for 3 hours. Then, 2,6-dimethylpyridine (0.50 g; 4.7 mmol) and styrene (90 g) were added to the reaction mixture solution for another 7-hr reaction under agitation at −78° C., followed by addition of methanol (100 ml) to terminate the reaction.

The resulting reaction mixture was washed in water, subsequently reprecipitated in methanol, to isolate an isobutylene-based polymer of a block copolymer type having polyisobutylene blocks and polystyrene blocks.

The number average molecular weight of the resulting polymer at the time when the sum of the conversions of isobutylene and styrene amounted to 95%, was 36,000 while the molecular weight distribution thereof was 1.21. At the time of reaction termination, furthermore, the number average molecular weight of the final polymer was 53,000 while the molecular weight distribution thereof was 1.65 (the molecular weight distribution of the final polymer at the time of reaction termination has a ratio of 1.36 to the distribution at the time of the conversion of 95%).

The results of the film preparation test of the final isobutylene-based polymer were evaluated and ranked as "A". Other analytical results and evaluation results of the final isobutylene-based polymer are shown in Table 1 below. The gel-permeation chromatogram of the final isobutylene-based polymer is shown in FIG. 1.

COMPARATIVE EXAMPLE 1

An isobutylene-based polymer of a block copolymer type having a polyisobutylene block and polystyrene blocks was produced by the same reaction procedures and post-treatment procedures as in Example 1, except that the reaction time after the addition of 2,6-dimethylpyridine and styrene was shortened from 7 hours to 2 hours.

The number average molecular weight of the resulting polymer at the time when the sum of the conversions of isobutylene and styrene amounted to 95%, was 34,000 while the molecular weight distribution thereof was 1.20. At the time of reaction termination, furthermore, the number average molecular weight of the final polymer was 34,000 while the molecular weight distribution thereof was 1.23 (the molecular weight distribution of the final polymer at the time of reaction termination has a ratio of 1.03 to the distribution at the time of the conversion of 95%).

Figure 2:
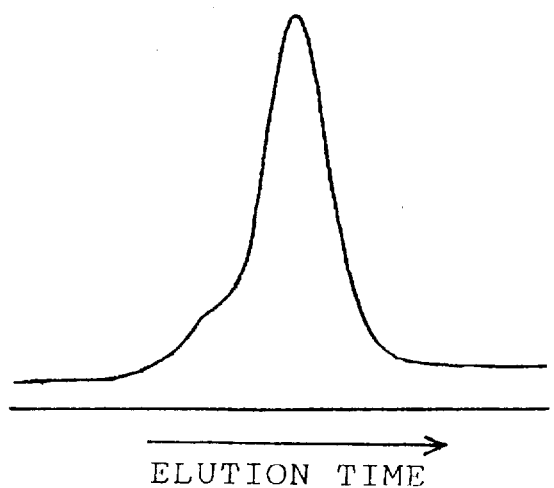
FIG. 2 is a gel-permeation chromatogram of the isobutylene-based polymer of Comparative Example 1 outside the scope of the present invention.

The results of the film preparation test of the final isobutylene-based polymer were evaluated and ranked as "B". Other analytical results and evaluation results of the final isobutylene-based polymer are shown in Table 1 below. The gel-permeation chromatogram of the final isobutylene-based polymer is shown in FIG. 2.

EXAMPLE 2

In a reaction vessel with an agitator were charged methylene chloride (800 ml) and methylcyclohexane (1200 ml), both preliminarily dehydrated on molecular sieves 4A, followed by individual additions of 1,4-bis(1-chloro-1-methylethyl) benzene (1.0 g; 4.3 mmol), 2,6-di-t-butylpyridine (1.74 g; 9.1 mmol), pyridine (0.68 g; 8.6 mmol) and isobutylene (210 g). By adding then titanium tetrachloride (12.3 g; 65 mmol) to the resulting mixture at −78° C., the reaction was initiated and continued under agitation of the resulting solution at the same temperature for 4 hours. Then, 2,6-di-t-butylpyridine (0.90 g; 4.7 mmol) and styrene (90 g) were added to the reaction mixture solution for another 12-hr reaction under agitation at −78° C., followed by addition of methanol (100 ml) to terminate the reaction.

The reaction mixture was washed in water, subsequently reprecipitated in methanol, to isolate an isobutylene-based polymer of a block copolymer type having polyisobutylene blocks and polystyrene blocks.

The number average molecular weight of the resulting polymer at the time when the sum of the conversions of isobutylene and styrene amounted to 95%, was 72,000 while the molecular weight distribution thereof was 1.22. At the time of reaction termination, furthermore, the number average molecular weight of the final polymer was 113,000 while the molecular weight distribution thereof was 1.76 (the molecular weight distribution of the final polymer at the time of reaction termination has a ratio of 1.44 to the distribution at the time of the conversion of 95%).

The results of the film preparation test of the final isobutylene-based polymer were evaluated and ranked as "A". Other analytical results and evaluation results of the final isobutylene-based polymer are shown in Table 1 below.

COMPARATIVE EXAMPLE 2

An isobutylene-based polymer of a block copolymer type having a polyisobutylene block and polystyrene blocks was produced by the same reaction procedures and post-treatment procedures as in Example 2, except that the reaction time after the addition of 2,6-di-t-butylpyridine and styrene was shortened from 12 hours to 4 hours.

The number average molecular weight of the resulting polymer at the time when the sum of the conversions of isobutylene and styrene amounted to 95%, was 74,000 while the molecular weight distribution thereof was 1.18. At the time of reaction termination, furthermore, the number average molecular weight of the final polymer was 75,000 while the molecular weight distribution thereof was 1.20 (the molecular weight distribution of the final polymer at the time of reaction termination has a ratio of 1.02 to the distribution at the time of the conversion of 95%).

The results of the film preparation test of the final isobutylene-based polymer were evaluated and ranked as "B". Other analytical results and evaluation results of the final isobutylene-based polymer are shown in Table 1 below.

EXAMPLE 3

In a reaction vessel with an agitator were charged methylene chloride (800 ml) and methylcyclohexane (1200 ml), both preliminarily dehydrated on molecular sieves 4A, followed by individual additions of 1,4-bis(1-chloro-1-methylethyl) benzene (0.5 g; 2.16 mmol), 2,6-dimethylpyridine (0.98 g; 9.1 mmol), pyridine (0.34 g; 4.3 mmol) and isobutylene (210 g). By adding then titanium tetrachloride (12.3 g; 65 mmol) to the resulting mixture at −78° C., the reaction was initiated and continued under agitation of the resulting solution at the same temperature for 8 hours. Then, 2,6-dimethylpyridine (0.50 g; 4.7 mmol) and styrene (90 g) were added to the reaction mixture solution for another 12-hr reaction under agitation at −78° C., followed by addition of methanol (100 ml) to terminate the reaction.

The reaction mixture was washed in water, subsequently reprecipitated in methanol, to isolate an isobutylene-based polymer of a block copolymer type having polyisobutylene blocks and polystyrene blocks.

The number average molecular weight of the resulting polymer at the time when the sum of the conversions of isobutylene and styrene amounted to 95%, was 153,000 while the molecular weight distribution thereof was 1.21. At the time of reaction termination, furthermore, the number average molecular weight of the final polymer was 182,000 while the molecular weight distribution thereof was 2.17 (the molecular weight distribution of the final polymer at the time of reaction termination has a ratio of 1.79 to the distribution at the time of the conversion of 95%).

Other analytical results and evaluation results of the final isobutylene-based polymer are shown in Table 1 below.

COMPARATIVE EXAMPLE 3

An isobutylene-based polymer of a block copolymer type having a polyisobutylene block and polystyrene blocks was produced by the same reaction procedures and post-treatment procedures as in Example 3, except that the reaction time after the addition of 2,6-dimethylpyridine and styrene was shortened from 12 hours to 4 hours.

The number average molecular weight of the resulting polymer at the time when the sum of the conversions of isobutylene and styrene amounted to 95%, was 150,000 while the molecular weight distribution thereof was 1.22. At the time of reaction termination, furthermore, the number average molecular weight of the final polymer was 155,000 while the molecular weight distribution thereof was 1.24 (the molecular weight distribution of the final polymer at the time of reaction termination has a ratio of 1.02 to the distribution at the time of the conversion of 95%).

Other analytical results and evaluation results of the final isobutylene-based polymer are shown in Table 1 below.

TABLE 1

|  | Example 1 | Comp. example 1 | Example 2 | Comp. example 2 | Example 3 | Comp. example 3 |
|---|---|---|---|---|---|---|
| Molecular weight at highest peak | 44000 | 37000 | 86000 | 76000 | 170000 | 154000 |
| (b)/(a) | 1.56 | 1.04 | 1.79 | 1.16 | 2.64 | 1.13 |
| Tensile strength (kg/cm$^2$) | 180 | 140 | 240 | 150 | 270 | 170 |
| Elongation at break (%) | 800 | 700 | 1000 | 900 | 1000 | 1000 |
| 100% modulus (kg/cm$^2$) | 13 | 11 | 19 | 16 | 17 | 14 |
| Compression set at 70° C. (%) | 65 | 80 | 60 | 77 | 62 | 78 |
| Compression set at 100° C. (%) | 75 | 88 | 73 | 85 | 69 | 85 |
| Melt viscosity (Pa · s) | 1000 | 200 | 1500 | 700 | 5000 | 3000 |

Comparisons of Example 1 with Comparative Example 1, Example 2 with Comparative Example 2, and Example 3 with Comparative Example 3, show that the isobutylene-based polymers (Examples 1 to 3) of the present invention, which were produced according to the process (i) wherein the reaction was continued after substantially total consumption of the monomers, acquired greater durability in the molded articles therefrom, which is illustrated for example by the decrease in compression set as well as higher mechanical performance represented by the improvement of tensile strength, elongation at break and 100% modulus, compared with the isobutylene-based polymers (Comparative Examples 1 to 3) which were produced when the polymerization was terminated at the time of substantially total consumption of the monomers. Furthermore, the evaluation results of the film preparation tests in Examples 1 and 2 and Comparative Examples 1 and 2 apparently indicate that some (Examples 1 and 2) of the isobutylene-based polymers of the present invention acquired improved extrusion moldability.

EXAMPLE 4

In a reaction vessel with an agitator were charged methylene chloride (800 ml) and methylcyclohexane (1200 ml), both preliminarily dehydrated on molecular sieves 4A, followed by addition of a linear-chain polystyrene-polyisobutylene-polystyrene triblock copolymer (250 g) (number average molecular weight; 73,000, molecular weight distribution; 1.25, isobutylene-unit content; 81 mol %, styrene-unit content; 19 mol %) containing a chemical structure of —CH$_2$—CH(—C$_6$H$_5$)—Cl at both the ends of the molecular main chain, for solubilizing the mixture. By adding then titanium tetrachloride (6.0 g; 32 mmol) to the resulting solution at −50° C., the reaction was initiated and continued under agitation of the resulting solution at the same temperature for 5 hours. Then, methanol (100 ml) was added to the reaction solution to terminate the reaction.

The reaction mixture was washed in water, subsequently reprecipitated in methanol, to isolate an isobutylene-based polymer of a block copolymer type having polyisobutylene blocks and polystyrene blocks.

The number average molecular weight of the final isobutylene-based polymer was 105,000 while the molecular weight distribution thereof was 1.68 (the molecular weight distribution of the final isobutylene-based polymer has a ratio of 1.34 to the distribution of the block copolymer used).

Other analytical results and evaluation results of the triblock copolymer used and the final isobutylene-based polymer are individually shown in Table 2 below.

TABLE 2

|  | Starting material polymer | Resulting polymer |
|---|---|---|
| Molecular weight at higher peak | 75000 | 88000 |
| (b)/(a) | 1.16 | 1.88 |
| Tensile strength (kg/cm$^2$) | 150 | 220 |
| Elongation at break (%) | 850 | 900 |
| 100% modulus (kg/cm$^2$) | 15 | 18 |
| Compression set at 70° C. (%) | 79 | 61 |
| Compression set at 100° C. (%) | 88 | 72 |
| Extrusion moldability | B | A |

The Table 2 shows that compared with the linear chain isobutylene-based polymer used, the isobutylene-based polymer with a far higher molecular weight produced according to the process (ii) in accordance with the present invention acquired greater durability in the molded articles therefrom, which is illustrated for example by the decrease in compression set, as well as remarkable mechanical performance represented by the improvement of tensile strength, elongation at break and 100% modulus. Furthermore, it is indicated that the isobutylene-based polymer of the present invention acquired improved extrusion moldability.

EXAMPLE 5

In a reaction vessel with an agitator were charged methylene chloride (800 ml) and methylcyclohexane (1200 ml), both preliminarily dehydrated on molecular sieves 4A, followed by individual additions of 1,4-bis(1-chloro-1-methylethyl) benzene (2.0 g; 8.7 mmol), 2,6-dimethylpyridine (0.98 g; 9.1 mmol), pyridine (1.38 g; 17.4 mmol) and isobutylene (210 g). By adding then titanium tetrachloride (12.3 g; 65 mmol) to the resulting mixture at −78° C., the reaction was initiated and continued under agitation of the resulting solution at the same temperature for 8 hours, followed by addition of methanol (100 ml) to terminate the reaction.

The reaction mixture was washed in water, subsequently reprecipitated in methanol, to isolate an isobutylene-based polymer composed of the isobutylene unit as the principal structural unit.

The number average molecular weight of the resulting polymer at the time when the conversion of isobutylene reached 95%, was 25,000 while the molecular weight distribution thereof was 1.11. At the time of reaction termination, furthermore, the number average molecular weight of the final polymer was 45,000 while the molecular weight distribution thereof was 1.45 (the molecular weight distribution of the final polymer at the time of reaction termination has a ratio of 1.31 to the distribution at the time of the conversion of 95%). The molecular weight at the highest peak on a gel-permeation chromatogram of the polymer at the time of reaction termination was 37,000, while the ratio (b)/(a) was 1.70 wherein "(a)" represents the length of the elution time in the lower molecular weight region of the mountain from the highest peak and "(b)" represents the length of the elution time in the higher molecular weight region of the mountain from the highest peak.

COMPARATIVE EXAMPLE 4

In a reaction vessel with an agitator were charged methylene chloride (800 ml) and methylcyclohexane (1200 ml), both preliminarily dehydrated on the molecular sieves 4A, followed by individual additions of 1,4-bis(1-chloro-1-methylethyl) benzene (2.0 g; 8.7 mmol), and isobutylene (210 g). By adding then titanium tetrachloride (4.94 g; 26.1 mmol) to the resulting mixture at −78° C., the reaction was initiated and continued under agitation of the resulting solution at the same temperature for 8 hours, followed by addition of methanol (100 ml) to terminate the reaction.

The reaction mixture was washed in water, subsequently reprecipitated in methanol, to isolate an isobutylene-based polymer composed of the isobutylene unit as the principal structural unit.

The number average molecular weight of the resulting polymer at the time when the conversion of isobutylene amounted to 95% was 11,800 with the molecular weight distribution of 2.23. The number average molecular weight of the final polymer at the time of reaction termination was 12,000 with the molecular weight distribution of 2.26. At the time of reaction termination, furthermore, the molecular weight of the final polymer at the highest peak on a gel-permeation chromatogram was 38,000 while the ratio (b)/(a) was 0.67, wherein "(a)" represents the length of the elution time in the lower molecular weight region of the mountain from the highest peak and "(b)" represents the length of the elution time in the higher molecular weight region of the mountain from the highest peak.

EXAMPLE 6

In a reaction vessel with an agitator were charged methylene chloride (800 ml) and methylcyclohexane (1200 ml), both preliminarily dehydrated on the molecular sieves 4A, followed by addition of a linear-chain polyisobutylene (250 g) number average molecular weight; 28,000, molecular weight distribution; 1.18) containing a chemical structure of —CH$_2$—C(CH$_3$)$_2$—Cl at both the ends of the molecular main chain, for solubilizing the mixture. By adding then titanium tetrachloride (6.0 g; 32 mmol) to the resulting mixture at −50° C., the reaction was initiated and continued under agitation of the resulting solution at the same temperature for 3 hours. Then, methanol (100 ml) was added to the reaction mixture to terminate the reaction.

The reaction mixture was washed in water, subsequently reprecipitated in methanol, to isolate an isobutylene-based polymer composed of the isobutylene unit as the principal structural unit.

The number average molecular weight of the final polymer was 36,000 with the molecular weight distribution of 1.55 (the ratio of the molecular weight distribution of the final isobutylene-based polymer was 1.31 to the polyisobutylene used). Furthermore, the molecular weight of the final polymer at the highest peak on a gel-permeation chromatogram was 31,000 while the ratio (b)/(a) was 1.83, wherein "(a)" represents the length of the elution time in the lower molecular weight region of the mountain from the highest peak and "(b)" represents the length of the elution time in the higher molecular weight region of the mountain from the highest peak.

What is claimed is:

1. An isobutylene-based polymer as a polymer of cationically polymerizable monomers principally composed of isobutylene or a combination of isobutylene and a styrene-series monomer, characterized in that the isobutylene-based polymer satisfies the following provisions;
   1. the isobutylene-based polymer has a continous molecular weight distribution on a gel-permeation chromatogram;
   2. the molecular weight at the highest peak on a gel-permeation chromatogram is within a range of 10,000 to 500,000; and
   3. the length (a) of the elution time in the lower molecular region of the mountain from the highest peak and the length (b) of the elution time in the higher molecular region of the mountain from the highest peak on a gel-permeation chromatogram, satisfy the provision represented by the formula (b)/(a)$\geq$1.3.

2. A polymer according to claim 1, wherein the "(a)" and "(b)" satisfy the provision represented by the formula (b)/(a)$\geq$1.4.

3. A polymer according to claim 1, wherein the ratio (Mw/Mn) of the weight average molecular weight (Mw) to the number average molecular weight (Mn) is within a range of 1.3 to 3.0.

4. A polymer according to claim 1, having at least one polymer block composed of a cationically polymerizable monomer unit principally composed of an isobutylene unit and at least one polymer block composed of a cationically polymerizable monomer unit principally composed of a styrene-series monomer unit.

5. A molded article comprising a polymer according to claim 1.

6. A process of producing an isobutylene-based polymer, comprising reacting together cationically polymerizable monomers principally composed of isobutylene or a combination of isobutylene and a styrene-series monomer in the presence of a polymerization initiating system comprising a compound having a group represented by the formula

$$—C(R^1)(R^2)—X \qquad (I)$$

(wherein $R^1$ and $R^2$ independently represent an alkyl group, an aryl group or an aralkyl group; X represents an acyloxyl group, an alkoxyl group, hydroxyl group or a halogen atom) and a Lewis acid, wherein the reaction is continued until the conversion of the cationically polymerizable monomers reaches at least 95% and wherein the reaction is continued until the provisions represented by,the following formulas (II) and (III) be satisfied;

$$Mn_2 > Mn_1 \qquad (II)$$

(wherein $Mn_1$ represents the number average molecular weight of the resulting isobutylene-based polymer at the time when the conversion of the cationically polymerizable monomers reaches 95%; $Mn_2$ represents the number average molecular weight of the final isobutylene-based polymer at the time of the reaction completion)

$$[Mw/Mn]_2/[Mw/Mn]_1 \geq 1.1 \tag{III}$$

(wherein $[Mw/Mn]_1$ represents the molecular weight distribution (the ratio of the weight average molecular weight/the number average molecular weight) of the resulting isobutylene-based polymer at the time when the conversion of the cationically polymerizable monomers reaches 95%; $[Mw/Mn]_2$ represents the molecular weight distribution (the ratio of the weight average molecular weight/the number average molecular weight) of the final isobutylene-based polymer at the time of the reaction completion).

7. A process according to claim 6, wherein the principal components of the cationically polymerizable monomers used are isobutylene and a styrene-series monomer and the cationically polymerizable monomer principally composed of isobutylene and the cationically polymerizable monomer principally composed of the styrene-series monomer are added independently with time lag to the reaction system.

8. A process of producing an isobutylene-based polymer with a far higher molecular weight, using an isobutylene-based polymer having the molecular main chain composed of cationically polymerizable monomer units principally comprising an isobutylene unit or a combination of an isobutylene unit and a styrene-series monomer unit and having an acyloxyl group, an alkoxyl group, hydroxyl group or a halogen atom at the end of a molecular main chain, wherein a reaction of the isobutylene-based polymer in the presence of a Lewis acid is continued until the provisions represented by the following formulas (IV) and (V) be satisfied;

$$Mn_4 > Mn_3 \tag{IV}$$

(wherein $Mn_3$ represents the number average molecular weight of the isobutylene-based polymer used; and $Mn_4$ represents the number average molecular weight of the final isobutylene-based polymer at the time of the reaction completion)

$$[Mw/Mn]_4/[Mw/Mn]_3 \geq 1.1 \tag{V}$$

(wherein $[Mw/Mn]_3$ represents the molecular weight distribution (the ratio of the weight average molecular weight/the number average molecular weight) of the isobutylene-based polymer used; $[Mw/Mn]_4$ represents the molecular weight distribution (the ratio of the weight average molecular weight/the number average molecular weight) of the final isobutylene-based polymer at the time of the reaction completion).

9. A process according to claim 8, wherein the isobutylene-based polymer to be used is a block copolymer containing within the molecular main chain at least one polymer block composed of the cationically polymerizable monomer unit principally composed of an isobutylene unit and at least one polymer block composed of the cationically polymerizable monomer unit principally composed of the styrene-series monomer unit.

* * * * *

UNITED STATES PATENT AND TRADEMARK OFFICE
CERTIFICATE OF CORRECTION

PATENT NO.   :   5,721,331
DATED:       :   FEBRUARY 24, 1998
INVENTOR(S)  :   KENJI SHACHI ET AL

It is certified that error appears in the above-identified patent and that said Letters patent is hereby corrected as shown below:

On the title page, delete Item [30] in its entirety and replace with:

--[30]   Foreign Application Priority Data
Mar. 8, 1995   [JP]   Japan ........................7-077336--.

Signed and Sealed this

Twenty-first Day of July, 1998

Attest:

BRUCE LEHMAN

*Attesting Officer*   *Commissioner of Patents and Trademarks*